United States Patent [19]

Ohrle et al.

[11] 4,183,577
[45] Jan. 15, 1980

[54] SLIDING ROOF FOR VEHICLES

[75] Inventors: Rolf Öhrle, Herrenberg; Richard Godel, Leonberg, both of Fed. Rep. of Germany

[73] Assignee: Daimler-Benz Aktiengesellschaft, Fed. Rep. of Germany

[21] Appl. No.: 881,899

[22] Filed: Feb. 27, 1978

[51] Int. Cl.² .............................................. B60J 7/10
[52] U.S. Cl. .............................................. 296/137 E
[58] Field of Search .................... 296/137 E, 137 H

[56] References Cited

U.S. PATENT DOCUMENTS

| 3,075,806 | 1/1963 | Gmeiner et al. | 296/137 E |
| 3,737,194 | 6/1973 | Lutz et al. | 296/137 E |

FOREIGN PATENT DOCUMENTS 2338798 2/1975 Fed. Rep. of Germany ....... 296/137 E
465339 6/1937 United Kingdom ................ 296/137 E

*Primary Examiner*—Robert R. Song
*Attorney, Agent, or Firm*—Craig and Antonelli

[57] ABSTRACT

A sliding roof for vehicles, especially for passenger motor vehicles, equipped with a sliding cover movable in the vehicle longitudinal direction within longitudinal guidances and with a locking mechanism for the sliding cover to prevent movement thereof relative to the longitudinal guidances; at least one pressure member movable along with the sliding cover is provided, which is guided and selectively actuatable transversely to the slide direction; the pressure members which preferably consist of suitable soft-elastic material, are adapted to engage with brake surfaces extending at least approximately vertically in the slide direction whereby the brake surfaces are provided with a roughening to increase the attainable brake forces.

18 Claims, 4 Drawing Figures

SLIDING ROOF FOR VEHICLES

The present invention relates to a sliding roof for vehicles, especially for passenger motor vehicles, with a sliding cover or top movable in the vehicle longitudinal direction within longitudinal guide means and with a locking device to stop movement of the sliding cover or top relative to the longitudinal guide means, for which at least one pressure member movable along with the sliding cover is provided, which is guided and selectively actuatable transversely to the displacement direction and at least approximately in the horizontal direction relative to the sliding cover or top, whereby the pressure member is preferably made of soft-elastic material and one pressure member each is arranged at the slide cover on both sides thereof, and for which additionally one hard brake surface each is provided in the longitudinal guide means on both sides of the sliding cover or top, corresponding to the arrangement of the pressure members, which brake surface is rigid at leaat in the sliding direction, is at least approximately vertical and extends in the sliding direction.

The stopping and locking of such a prior art sliding cover or top in a selected open position, as described, for example, in the German Offenlegungsschrift 1,580,603 or the German Offenlegungsschrift No. 2,011,421, is to be undertaken according to safety regulations with a predetermined minimum force, in order that with extremely strong accelerations or decelerations of the sliding cover or top, conditioned above all on accidents, the sliding cover or top maintains its relative position; thus, for example, in case of an impact accident from behind, the sliding roof of the forward vehicle which, for example, is only slightly opened, should not open any further as a result of the impact.

With wide and therefore with heavy sliding covers or tops, the pressure members must transmit large brake forces in order to be able to withstand in an operationally reliable manner the inertia forces which occur during the minimum acceleration- and deceleration-values. Above all with larger and wider vehicles, in which the sliding covers or tops are heavier for several reasons than those of narrower vehicles, the requisite brake force cannot be produced without difficulty by the pressure members, especially as the abutment force for the most part has to be manually applied or—in case of a spring abutment—has to be manually released. In that connection, consideration must also be given to the fact that the stopping and locking has to be actuated to an operationally safe manner above the head, i.e., in an inconvenient position and by older persons or by women, i.e. by persons from whom one cannot expect altogether exesssive actuating forces in every case.

It is the aim of the present invention to indicate an approach, how the brake forces for the sliding cover or top of a sliding roof can be increased to sufficient values also with heavy sliding covers or tops, notwithstanding abutment forces manually controllable in each case without involving excessive outlay in construction and manufacture.

This problem is solved according to the present invention by the combination of the following features:

(a) Each pressure member, provided with a rubber surface, is made as a rotatably borne brake roll, with an axis of rotation parallel to the direction of displacement of the sliding top;

(b) at those places on the brake surfaces at which the brake rolls are located in the closed position of the sliding top with respect to the brake surfaces, an upwardly slanting surface is provided in the brake surface, whereon, with spreading of the opposed brake rolls, the said rolls will roll upward and lift the sliding top;

(c) the brake surfaces are provided at regular intervals with vertically running rounded corrugations, whose mutual separation corresponds approximately to the width of the brake rolls.

According to the invention therefore, the roll needed for lifting the sliding top in the closed end position is also utilized for stopping the sliding top, whereby there is a simplification in construction. If a sliding top locked in its open position is stressed by longitudinal forces, e.g. in deceleration or in acceleration of the vehicle, these forces will be carried off via the brake roll and the brake surface into the frame of the sliding roof. Since the brake roll is stressed parallel to the axis of rotation by these longitudinal forces, because of an axial fixation of the brake roll, said roll is capable of transmitting high frictional forces. It is backed up here especially by the vertically running rounded corrugations in the brake surface. Because of a mutual adjustment of the separation of the corrugations on the one hand, and the width of the brake roll on the other, there can be a certain positive engagement between brake surface and brake roll. The brake roll is pressed in between two adjacent corrugations. In this way very great holding forces can be produced, even with manually applied pressing forces. In a locking of the sliding top in an intermediate position, if there is stressing of the sliding top by a longitudinal force, the sliding top automatically slips into a position such that the brake roll will be engaged between two adjacent corrugations.

The washboard-like corrugation of the brake surface, in addition to the functional advantages already outlined, has the further advantage that this roughening can be made in one work step with the stamping of the corresponding sheet parts, without additional outlay. The vertical corrugation, as opposed to other types of roughening, also has the advantage of wall reinforcement and a good run-off of water and dirt (self cleaning).

The invention will be briefly discussed below with reference to an example of the embodiment shown in the drawing.

Figure 1:
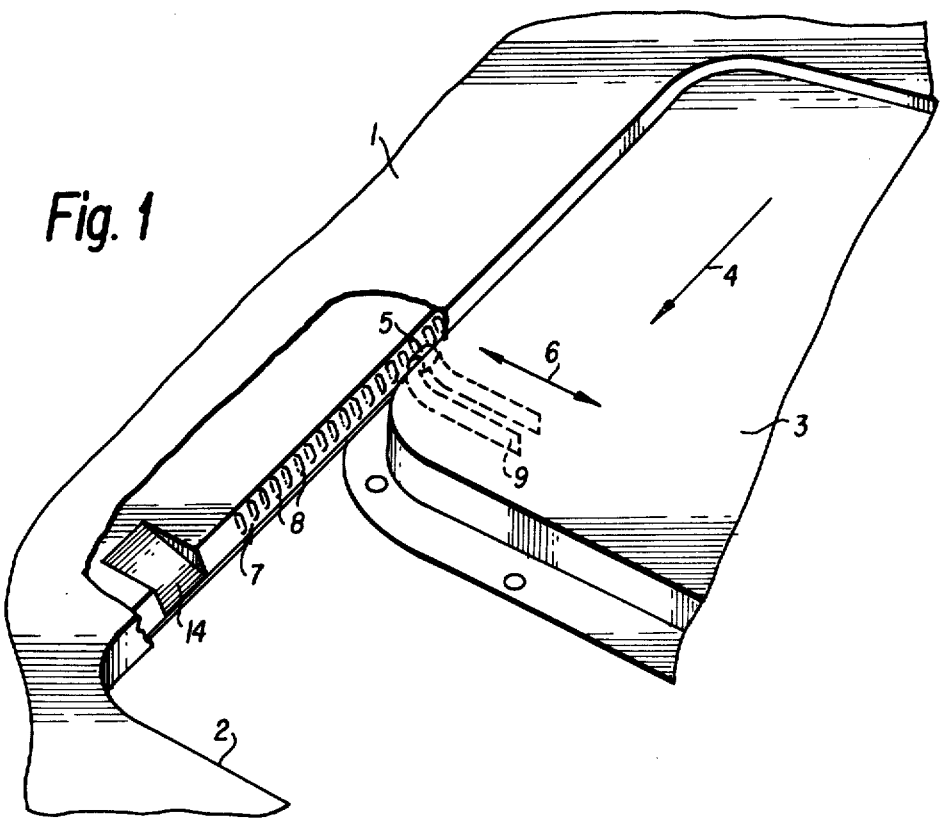
FIG. 1 shows a perspective view of part of the sliding roof guide with the brake surface.
Figure 2:
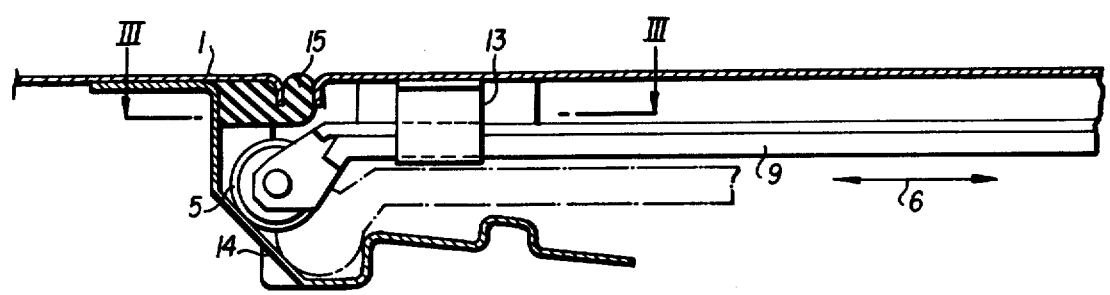
FIGS. 2 and 3 show a cross-section (FIG. 2) and a horizontal projection (FIG. 3) through part of the sliding top guide in its closed position, and FIG. 4, on a larger scale, shows the brake surface and the brake roll.
Figure 3:
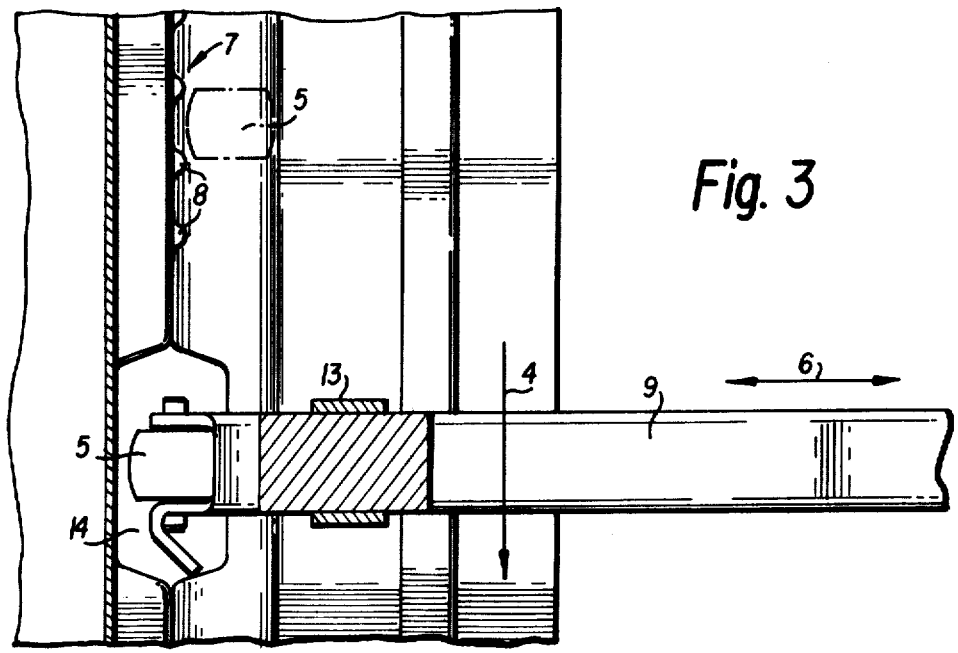
Figure 4:
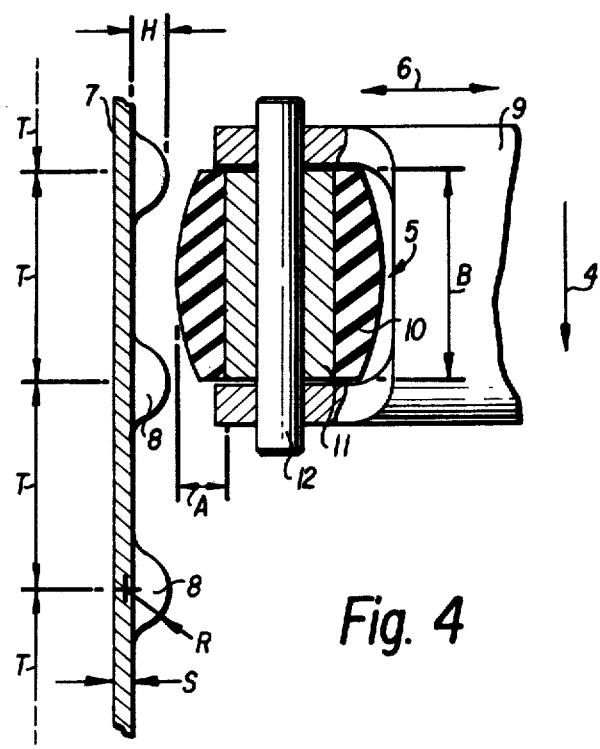

Referring now to the drawing figures, reference numeral 1 designates the partially illustrated roof of a passenger motor vehicle (not shown). The sliding cover or top 3 is longitudinally displaceable in the vehicle longitudinal direction, indicated by arrow 4, inside of the roof cutout 2 provided in the roof 1 and can be stopped and held fast in any desired intermediate position. For this, there are brake pressure members made as rotatable rolls 5, which extend laterally beyond the sliding top into the guide, and which can be pressed outward by means of a handle disposed on the underside of the top, via stop rods 9 guided crosswise to the direction of displacement and movable crosswise, in the direction of arrow 6. Stop rods 9 are guided so as to be movable crosswise with reference to the sliding top, in a longitudinal guide 13, so that they cannot execute motions relative to the sliding top, either in direction 4 or vertically. In the position of the brake rolls that corresponds relative to the closed position of the sliding top and the sliding top guide, there is an upwardly slanted surface 14 at the sides. With spreading of the opposedly situated brake rolls, these members roll upward on the inclined surface and thereby lift the sliding top in the roof cutout and force it into seal 15. With opening of the roof, the brake rolls are again pulled back, whereby they roll down on inclined surface 14 and thereby again lower the sliding top from roof cutout 2 so that it can be thrust backward under the roof shell. On each sliding top there are at least two brake rolls with corresponding stop rods, opposite each other to left and right. If only one opposing pair of brake rolls is provided on the sliding top, this pair is advantageously disposed at the rear on the sliding top, in the direction of travel. With two opposed pairs of brake rolls, they are disposed at the front and rear on the sliding top.

Starting from inclined surfaces 14, there extend backward, connected therewith in the direction of displacement, vertically standing brake surfaces 7 which run parallel to the guide of the sliding top. To stop the sliding top in an opened intermediate position, the brake rolls are pressed onto these braking surfaces. Although the brake pressure member is made as a roll, braking forces can be exerted with it in the direction of displacement 4, nonetheless, because the axis of rotation 12 of the roll extends parallel to direction 4.

To increase the holding forces in stopping the sliding top, rounded corrugations 8 are supplied in brake surface 7 at regular intervals (spacing distant T). The spacing distance between these corrugations more or less corresponds to width B of the brake roll. The brake roll can be pressed in by the front between two adjacent corrugations 8, whereby a lateral sliding away is prevented even when there are strong displacement forces. In addition to retention of the brake roll on the brake surface in the direction of displacement by the corrugations, adhesion can also be effected by a rubber covering 10 on the roll, which arrangement yields a high coefficient of friction. The external contour of the brake roll is round or barrel-shaped, so that it can more readily seek a middle portion between two adjacent corrugations 8. If the brake roll is placed on a single corrugation 8 when the sliding top is stopped in a specific position, holding in this position can also be ensured if, in stop rod 9, there is a spring-elastic balancing capability, in the amount of corrugation height H. With force acting on the sliding top in the longitudinal direction, e.g. in braking or deceleration, the stop then slips in automatically between the two nearest adjacent corrugations and automatically effects a secure, practically positive engaging stop of the sliding top.

To make possible such an intermediate position, yet to ensure a long life expectancy for the rubber-covered brake roll, the configuration of the corrugations and the hardness of rubber covering 10 are specifically adjusted with respect to each other. The rubber covering of the brake roll has a Shore hardness of about 75 to 85, advantageously about 80. This rubber hardness is to be seen in conjunction with thickness A of the rubber covering, applied on a metallic sleeve 11. Thickness A corresponds more or less to height H of corrugations 8. Thereby, on the one hand, the rubber covering is still soft enough to have a large-area surface in spite of the fact that the brake pressure member is made as a roll, and to be able to get a high coefficient of friction, and, on the other hand, the rubber covering is hard enough so that it cannot be squeezed out of shape by the corrugations, and thus will have a long life expectancy. To increase the life expectancy of the brake pressure rolls, there is also the contributing factor that the corrugations are made with a moderate rounding radius R which likewise more or less corresponds to thickness A of the brake roll. This rounding radius corresponds on the other hand to about twice the sheet thickness (sheet thickness S) so that it can be made without difficulty by a simple cupping process.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. Sliding roof for vehicles, especially passenger cars, comprising:
   a sliding cover movable in longitudinal guides in the longitudinal direction of the vehicle;
   means for stopping the sliding cover relative to the longitudinal guides;
   at least one pressure member means provided on either side of the sliding cover for guiding and arbitrarily moving with the sliding cover crosswise to the direction of displacement, at least approximately in the horizontal direction with reference to the sliding cover;
   on either side of the sliding cover in the longitudinal guides, an at least approximately vertical standing hard brake surface that runs in the direction of displacement;
   said pressure member being provided with a rubber surface made as a rotatably borne brake roll with an axis of rotation parallel to the direction of displacement of the sliding cover;
   at those places on the brake surface at which the braking rolls are located in the closed position of the sliding cover, upwardly slanted surfaces being provided in the brake surfaces, on which said upwardly slanted surfaces, in the spreading of the opposed brake rolls, said brake rolls roll upward and lift the sliding cover; and
   said brake surfaces being provided at regular intervals with vertically directed corrugations whose mutual distance of separation corresponds about to the width of the brake roll.

2. Sliding roof as in claim 1, wherein the brake roll has a round barrel-shape.

3. Sliding roof as in claim 1, wherein the rubber covering of the brake roll has a Shore hardness of about 75 to 85, advantageously about 80.

4. Sliding roof as in claim 1, wherein the thickness of the rubber covering of the brake roll corresponds more or less to the height of the corrugations.

5. Sliding roof as in claim 1, wherein the radius of the corrugations corresponds more or less to the thickness of the rubber covering of the brake roll.

6. Sliding panel arrangement for vehicles, especially passenger vehicles, comprising:

an opening to a passenger space in relatively fixed vehicle body structure, a sliding cover which is movable to selectively open and close said opening, and brake means for retaining said sliding cover in respective stopped positions along the opening, wherein said brake means includes at least one pressure member carried by said cover and brake applying means for selectively forcing said pressure member into and out of engagement with braking surface means provided at the relatively fixed body structure, said braking surface means including a slanted surface portion engageable with said pressure member when said cover is in a predetermined position along the length of the opening, said slanted surface portion being configured to force said pressure member and sliding cover in a direction transverse to the travel direction of the sliding cover and outwardly with respect to the passenger space in response to increased braking force by said brake applying means, and wherein portions of said braking surface means other than said slanted surface portion include corrugations engageable with said pressure member to aid in locking said cover member in respective intermediate open positions.

7. Sliding panel arrangement according to claim 6, wherein said pressure member is a member rotatable about an axis parallel to the travel direction of the sliding cover.

8. Sliding panel arrangement according to claim 7, wherein said pressure member is provided with a resilient cover portion engageable with said braking surface means.

9. Sliding panel arrangement according to claim 7, wherein said pressure member has an axial length corresponding to the length of said slanted surface portion, said slanted surface portion being bounded at the axial ends thereof by transversely extending fixed parts engageable with axial end portions of the pressure member to prevent axial movement of the sliding cover when in said predetermined position with said pressure member engaging said slanted surface portion.

10. Sliding panel arrangement according to claim 9, wherein said predetermined position is a closed position of said sliding cover.

11. Sliding panel arrangement according to claim 6, wherein said corrugations include a plurality of corrugations mutually spaced from one another a distance corresponding to the length of the pressure member in the travel direction of the sliding cover, whereby said corrugations engage axial ends of the pressure member to assist in holding the sliding cover in respective stopped positions.

12. Sliding panel arrangement according to claim 8, wherein said corrugations include a plurality of corrugations mutually spaced from one another a distance corresponding to the length of the pressure member in the travel direction of the sliding cover, whereby said corrugations engage axial ends of the pressure member to assist in holding the sliding cover in respective stopped positions.

13. Sliding panel arrangement according to claim 10, wherein said corrugations include a plurality of corrugations mutually spaced from one another a distance corresponding to the length of the pressure member in the travel direction of the sliding cover, whereby said corrugations engage axial ends of the pressure member to assist in holding the sliding cover in respective stopped positions.

14. Sliding panel arrangement according to claim 7, wherein said pressure member is a brake roll with a rubber covering.

15. Sliding panel arrangement according to claim 11, wherein said pressure member is a brake roll with a rubber covering.

16. Sliding panel arrangement according to claim 6, wherein said sliding cover is a sliding roof member for the top of a passenger vehicle, wherein the travel direction of the roof member is in the longitudinal travel direction of the vehicle and wherein at least two of said pressure members are provided which are engageable respectively with brake surface means at each lateral side of said opening.

17. Sliding panel arrangement according to claim 11, wherein said sliding cover is a sliding roof member for the top of a passenger vehicle, wherein the travel direction of the roof member is in the longitudinal travel direction of the vehicle and wherein at least two of said pressure members are provided which are engageable respectively with brake surface means at each lateral side of said opening.

18. Sliding panel arrangement according to claim 15, wherein said sliding cover is a sliding roof member for the top of a passenger vehicle, wherein the travel direction of the roof member is in the longitudinal travel direction of the vehicle and wherein at least two of said pressure members are provided which are engageable respectively with brake surface means at each lateral side of said opening.

* * * * *